INVENTOR.
JAMES C. WERNER

United States Patent Office 3,397,263
Patented Aug. 13, 1968

3,397,263
PROCESS FOR PREPARING SMOOTH
NYLON FILM
James C. Werner, Henderson, Ky., assignor, by mesne assignments, to Gulf Oil Corporation, Pittsburgh, Pa., a corporation of Pennsylvania
Filed Feb. 24, 1964, Ser. No. 346,746
5 Claims. (Cl. 264—216)

ABSTRACT OF THE DISCLOSURE

A method of preparing nylon film by extruding a molten web of nylon and cooling the web on a surface maintained at about ambient temperature to 200° F. The cooled self-supporting web is then separated from the surface and treated with steam for a few seconds at about 212° F. to 230° F. and then wound onto a storage roll.

This invention relates to improved films of nylon and to improved processes for preparing such films. In a particular aspect the invention concerns nylon films which are characterized by the absence of quilting and gauge bands.

Nylon film is prepared by extruding a semi-molten web, typically of a thickness of from about 0.5 to about 3.0 mils, onto a surface maintained at a temperature considerably less than the temperature of the semi-molten web, typically an internally cooled, rotating drum or a series of such drums, maintaining the web in cooling heat-exchange contact with said cooled surface until the temperature of the web is reduced to the point that it is self-supporting, typically until the temperature of the film is reduced to about 200° F., preferably to at least below 230° F., and then separating the self-supporting web from the cooled surface. Thereafter the web is usually prepared for storage by winding it onto storage rolls.

Such "chill-cast" nylon film has rather remarkable clarity and strength which makes it a prime candiate for use in many packaging applications. However, as currently prepared, such film is very troublesome to process because of structural regularities in the film which detract from the aesthetic appearance of the film, which make it difficult to prepare laminates of such films with substrates such as papers, metal foils and the like, and which make it difficult to prepare such films which are coated with other resins such as polyethylene, saran and the like.

These structural irregularities are called "quilting" and "gauge bands." Quilting is caused by simultaneous absorption of water and relaxation of the film during storage and results in the film having an irregular wrinkled or quilted appearance. Gauge bands are caused by the enhancement of uneven film thickness in the transverse direction of the extruded film, this enhancement again being amplified by simultaneous absorption of water and relaxation of the film during storage. Gauge bands appear as pronounced ridges running in the machine direction of the film.

I have now discovered that the formation of quilting and the gauge bands in cast nylon film can be substantially eliminated by treating the film with steam after the semi-molten web has been cooled so as to be self-supporting and, advantageously, prior to winding the film onto the storage roll.

Figure 1:
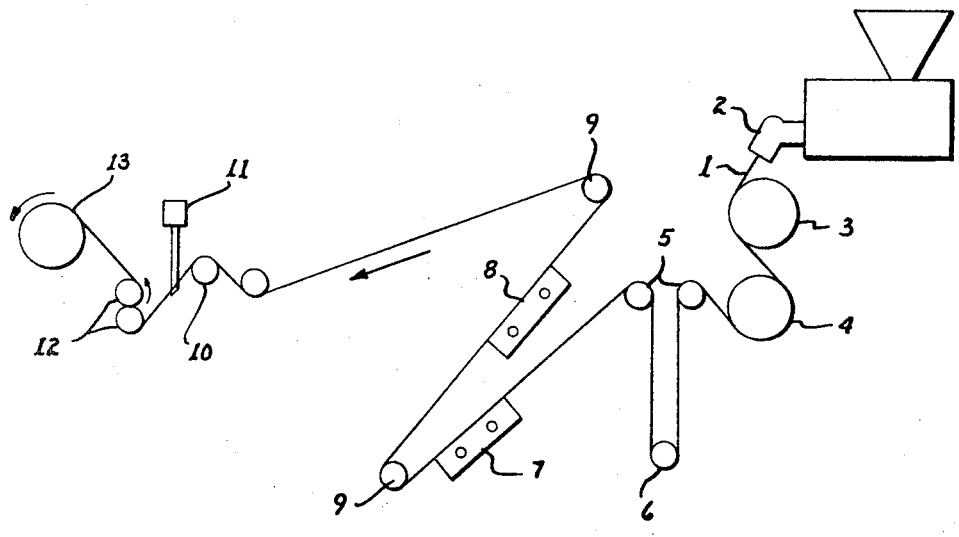
Figure 2:
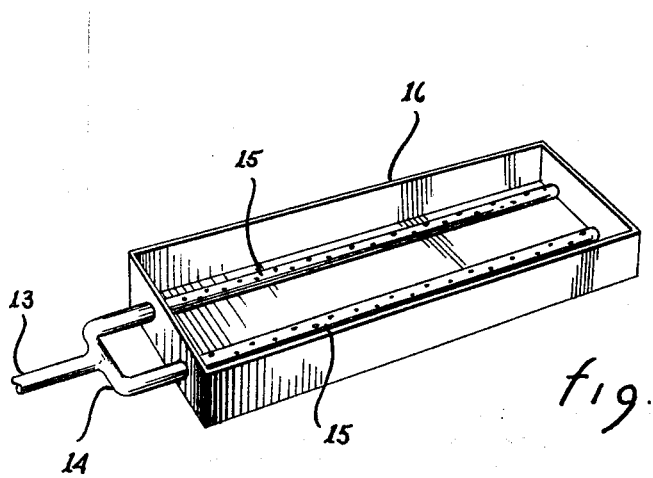

Turning now to the drawings, FIGURE 1 is a schematic illustration of an apparatus which can be used in the practice of the method of my invention wherein a nylon film web is extruded, chill-cast, treated with steam and wound on a storage roll. FIGURE 2 is a schematic illustration showing in greater detail that portion of the apparatus of FIGURE 1 wherein the steam-treating is accomplished.

As shown in FIGURE 1, a semi-molten web of nylon is extruded, typically at a temperature upwards of 500° F., by means of extruder and die 2 onto chill rolls 3 and 4 which are internally cooled so as to maintain the surface thereof at a temperature considerably less than that of the extruded web, for example, typically at a temperature of about 200° F. The chill rolls 3 and 4 are so arranged as to permit the nylon web to be contacted on both sides in cooling heat exchange relationship with the chill roll surfaces. After the nylon web has been cooled, preferably to a temperature substantially equal to the chill roll temperature, such that it will be self-supporting, the web is led through a system of idler pulleys 5 and a dancer roll 6 which compensates for and dampens slight variations in film speed so as to provide substantially constant tension on the web throughout the remainder of the process. Thereafter, the film web passes around idler rolls 9 which causes the film to pass first across the steam-treating chamber 7 whereby one side of the film is treated with steam contained within the steam-treating chamber and past steam-treating chamber 8 whereby the other side of the film is treated with steam in a similar manner. Thereafter, the nylon film which has been treated on both sides with steam passes through another system of idler pulleys 10 which position the film for trimming by trimmers 11, whereupon the trimmed treated film passes through nip rolls 12 and is wound on the storage roll 13.

The steam-treating chambers 7 and 8 are shown in greater detail in FIGURE 2. The steam is passed through inlet line 13 into a header 14 which supplies the steam to one or more sparge pipes 15 provided with a plurality of apertures for distributing the steam within the enclosure of the steam-treating chamber 16 which is a rectangular box made of metal such as sheet steel, open on one side and so proportioned and positioned that the nylon film web passing the open side forms a substantially continuous closure for the open side and passes closely, for example within 1 to 4 inches, of the apertures in the steam-sparge pipes 15.

Of course, many variations of the afore-described specific apparatus will occur to those skilled in the art whereby the method of my invention can be employed using other specific arrangements of apparatus. For example, instead of the separate steam chambers 7 and 8, one could employ a single chamber provided with a pair of slits on opposite sides thereof and with steam storage pipes above and below these slits so as to permit one to pass the nylon film web in one slit, between the storage pipes and out the other slit, the film then defining two steam-treating chambers, one on one side of the film and the other on the other side of the film.

I have found that it is necessary to carry out the steam-treating steps after the semi-molten extruded nylon web has been chilled to a self-supporting stage, and preferably, after the web has been further cooled, for example to approximately ambient temperature. It does not appear that the treating step can be efficiently carried out, for example, while the film is in heat exchange relationship with the chill rolls 3 or 4. Also, it is advisable to steam-treat the nylon film prior to winding the film onto the storage roll, since the development of quilting and gauge bands occurs subsequently while the film is wound on the storage roll. There are indications, however, that even after such quilting and gauge bands have developed on untreated film, it is possible to substantially remove them, although not quite as efficiently as if the film had been steam-treated in the first instance, by unwinding the film from the storage roll and subjecting it to steam treatment as herein described.

The following example is presented to illustrate, in connection with the drawings, the practice of the method of my invention in one preferred embodiment thereof:

Example 1

A melt of nylon maintained at a temperature of 500° F. is continuously extruded and passed through the apparatus of FIGURE 1 at a speed of 40 feet per minute. The chill rolls are internally cooled with circulating water to maintain a chill roll temperature of 200° F. Both sides of the nylon film are treated by passing the film over the steam-treating chambers as shown in FIGURE 1. Steam was supplied to the inlet of each of the steam-treating chambers at a pressure of 15 p.s.i.g. and at a temperature of approximately 200° F. Just prior to passing across the open side of the steam-treating chamber, the nylon film had cooled to approximately ambient temperature. The treated film contained 5 weight percent water.

The film thus continuously produced was wound on a storage roll and stored for 3 months at a temperature of from about 65 to about 80° F. and at a relative humidity of from about 40 to about 60%. The film thus prepared and stored failed to develop any substantial gauge bands or quilting.

Example 2

Nylon film prepared and stored under conditions identical to those described in Example 1 except that the steam-treatment was omitted develops severe gauge bands and quilting after only 1 day of storage.

Example 3

The film of Example 2 is coated by extrusion coating techniques with a 2 mil thickness of polyethylene. Because of the severe quilting and gauge bands, the resulting polyethylene coated nylon film was unacceptable because of poor gauge control and poor adhesion between the nylon and the polyethylene in the regions of the quilting and gauge bands irregularities. By contrast, the film of Example 1, when coated in the same manner has good gauge control and good adhesion between the nylon film and the polyethylene coating.

The obtention of the desired excellent roll conformation, i.e. substantial absence of quilting and gauge bands, is generally obtained by the method of my invention by incorporation of from about 3 wt. percent to about 5 wt. percent of water into the film, although smaller amounts are partially effective and larger amounts are not harmful. The specific amount of water incorporated into the film by my method will depend upon several factors such as the temperature of the film just prior to the stream-treating step, the temperature of the steam and the thickness and moisture content of the untreated film and the time the film is exposed to the steam.

In general it is preferred to treat the cast film with steam at substantially atmospheric pressure and at a temperature somewhat above saturation temperature, for example at about 220° F., as treatment in this manner greatly simplifies the apparatus required.

Thus, for example, I have found that in the case of freshly cast nylon film of a thickness of from about 0.5 to about 3 mils and containing substantially no moisture, the method of my invention can be carried into practice by exposing at least one side, preferably both sides, of the film to 220° F. steam for from about 3 seconds to about 6 seconds, these contact times being sufficient to incorporate into the film upwards of from about 3% to about 5% water. As will be apparent to those skilled in the art, the optimum amount of moisture to be incorporated into the film by steam-treatment may vary somewhat, depending upon the thickness of the film, its thermal and hygrometric history and, to some degree, upon the severity of the dielines introduced in the film by the extrusion step. Thus, a film having a thickness of upwards of 5 to 7 mils has substantial inherent structural strength which will, to a large degree, prevent the formation of gauge bands and quilting. Manifestly, it is unnecessary to incorporate into a film having this thickness the amount of water required to be incorporated into a film of say 0.5 mil thickness which has reduced inherent structural strength and is therefore extremely susceptible to the development of these structural irregularities. Furthermore, a film in which such quilting and gauge bands have already developed due to long storage and exposure to humid air will normally require a somewhat longer exposure to steam-treatment in order to incorporate into the film at the same treating temperatures sufficient additional moisture to substantially remove these irregularities.

Thus, in view of the foregoing remarks, it is apparent that the optimum treating time, percent absorbed moisture, treating tempertaure, and so forth, should be determined for each type of film to be treated. This can be done by routine experimentation of those of ordinary skill having regard for the invention disclosed.

Having fully described my invention and the presently preferred embodiment thereof, I claim:

1. In a process for preparing chill-cast nylon film comprising extruding a semi-molten web of nylon of a thickness of from about .5 to about 3 mils and at a temperature of about 500° F. onto a surface maintained at about 200° F., maintaining said web in cooling heat-exchange contact with said surface, thereby cooling said web to a temperature of about 200° F. until said web becomes self-supporting, separating said cooled self-supporting web from said surface, and preparing the film for storage by winding it onto a storage roll, the improvement comprising the step in combination with said process of treating said web with steam at substantially atmospheric pressure and at a temperature of from about 212 to about 230° F., the said steam-treatment being accomplished subsequent to separating said cooled self-supporting web from said surface and prior to winding said film onto said storage roll.

2. In a process for preparing chill-cast nylon film comprising extruding a semi-molten web of nylon of a thickness of from about 0.5 mil to about 3 mils onto a surface maintained between ambient temperature and about 200° F., maintaining said web in cooling heat-exchange contact with said surface, thereby cooling said web to a temperature in the range of between ambient temperature and about 200° F. until said web becomes self-supporting, separating said cooled self-supporting web from said surface, and preparing the web for storage by winding it onto a storage roll; the improvement comprising a step in combination with said process of treating said web with steam at substantially atmospheric pressure and at a temperature of from about 212 to about 230° F. for a period of time sufficient to incorporate from about 3 to about 5 percent water into said nylon, the said steam-treatment being accomplished subsequent to separating said cooled self-supporting web from said surface and prior to winding said film onto said storage roll.

3. The process of claim 2 wherein said web is cooled to about ambient temperature prior to said steam treating step.

4. The process of claim 2 wherein said process of treating said self-supporting and separated web with steam comprises contacting one surface of said web with steam and thereafter contacting a second surface of said web with steam.

5. The process of claim 2 wherein said steam-treating step is conducted for a period of from about 3 seconds to about 6 seconds.

References Cited
UNITED STATES PATENTS

| 3,257,489 | 6/1966 | Heffelfinger | 264—289 |
| 2,157,117 | 5/1939 | Miles | 28—1 |
| 2,157,118 | 5/1939 | Heckert | 28— |
| 2,736,066 | 2/1956 | Chren | 264—17 |

FOREIGN PATENTS 219,106   12/1958   Australia.

ROBERT F. WHITE, *Primary Examiner.*

G. AUVILLE, *Assistant Examiner.*